(12) United States Patent
Belveal, Sr.

(10) Patent No.: US 9,944,873 B1
(45) Date of Patent: Apr. 17, 2018

(54) ADD-ON SYSTEM FOR REMOVING PARAFFIN FROM A NATURAL GAS DEHYDRATION SYSTEM

(71) Applicant: Phil Belveal, Sr., Pinedale, WY (US)

(72) Inventor: Phil Belveal, Sr., Pinedale, WY (US)

( * ) Notice: Subject to any disclaimer, the term of this patent is extended or adjusted under 35 U.S.C. 154(b) by 177 days.

(21) Appl. No.: 15/138,569

(22) Filed: Apr. 26, 2016

(51) Int. Cl.
*C10L 3/10* (2006.01)
*B01D 53/14* (2006.01)

(52) U.S. Cl.
CPC .......... *C10L 3/106* (2013.01); *B01D 53/1418* (2013.01); *B01D 53/1425* (2013.01); *C10L 2290/12* (2013.01); *C10L 2290/541* (2013.01)

(58) Field of Classification Search
CPC ............ B01D 53/1418; B01D 53/1425; B01D 2257/80; C10L 3/106; C10L 2290/12
See application file for complete search history.

(56) References Cited

U.S. PATENT DOCUMENTS

| | | | | |
|---|---|---|---|---|
| 3,824,177 A | * | 7/1974 | Honerkamp | B01D 53/1425 159/31 |
| 4,009,083 A | * | 2/1977 | Lyon | B01D 53/1425 159/DIG. 33 |
| 4,536,222 A | | 8/1985 | Settineri | |
| 5,234,552 A | | 8/1993 | McGrew | |
| 5,346,537 A | * | 9/1994 | Lowell | B01D 53/1425 95/161 |
| 5,350,519 A | * | 9/1994 | Kaschemekat | B01D 61/362 210/416.1 |
| 5,520,723 A | | 5/1996 | Jones, Jr. | |
| 5,788,745 A | * | 8/1998 | Hahn | B01D 53/1425 203/14 |
| 6,080,280 A | | 6/2000 | Moore, Jr. | |
| 6,251,166 B1 | | 6/2001 | Anderson | |
| 6,416,670 B1 | * | 7/2002 | Cummings | B01D 53/1425 210/673 |
| 7,935,228 B1 | | 5/2011 | Rhodes | |
| 9,034,185 B2 | | 5/2015 | Kim | |
| D734,363 S | | 7/2015 | Moreira | |
| 2010/0154638 A1 | * | 6/2010 | Ferrando | B01D 53/1425 95/179 |

(Continued)

FOREIGN PATENT DOCUMENTS

WO    WO 95/03118    *   2/1995   ............ B01D 61/36

*Primary Examiner* — Jason M Greene
(74) *Attorney, Agent, or Firm* — Kyle A. Fletcher, Esq.

(57) ABSTRACT

The add-on system for removing paraffin from a natural gas dehydration system is a method of removing paraffin from the dehydrated TEG. The add-on system for removing paraffin from a natural gas dehydration system processes the cooled and dehydrated TEG through a second heat exchanger, which raises the temperature of the dehydrated TEG to a previously determined temperature. Once the dehydrated TEG is at temperature, the TEG is processed through one or more separators, which separates the paraffin from the dehydrated TEG. The separated paraffin is collected in one or more collection apparatus for disposal while the processed TEG is released to further processing and delivery to the contactor for reuse. The add-on system for removing paraffin from a natural gas dehydration system comprises a second heat exchanger, one or more separators, one or more pumps, one or more collection apparatus, and a plurality of valves.

15 Claims, 3 Drawing Sheets

(56) References Cited

U.S. PATENT DOCUMENTS

2012/0060690 A1\* 3/2012 Kidambi ............ B01D 53/1425
                                                                                                95/207
2014/0174903 A1\* 6/2014 Edwards ............ B01D 53/1425
                                                                                                203/18

\* cited by examiner

ADD-ON SYSTEM FOR REMOVING
PARAFFIN FROM A NATURAL GAS
DEHYDRATION SYSTEM

CROSS REFERENCES TO RELATED
APPLICATIONS

Not Applicable

STATEMENT REGARDING FEDERALLY
SPONSORED RESEARCH

Not Applicable

REFERENCE TO APPENDIX

Not Applicable

BACKGROUND OF THE INVENTION

The present invention relates to the field of physical or chemical processes and the separation of gasses, vapors, and liquids, more specifically, an apparatus that separates paraffin from triethylene glycol.

Raw natural gas is generally saturated with water vapor that needs to be removed in order to further process or sell natural gas. The process is referred to in this disclosure as natural gas dehydration. The traditional natural gas dehydration system passes the natural gas through a bath of triethylene glycol in a device called a contactor 131. Because triethylene glycol (TEG 130) has a significantly higher affinity for water than raw natural gas the TEG 130 will capture water vapor from the natural gas thereby dehydrating the natural gas.

In order to maintain the efficiency of a natural gas dehydration system, the water accumulated in the TEG 130 must be removed in order to prevent the TEG 130 from being saturated. In the traditional dehydration system, water is removed from the TEG 130 using a reboiler 132. The reboiler 132 heats the water laden TEG 130 to a temperature sufficient to drive the captured water from the TEG 130 thus allowing the TEG 130 to be reused. This dehydrated TEG 130 is then processed through a first heat exchanger 133 which cools the TEG 130 by capturing heat from the TEG 130 and reprocessing the heat elsewhere within the natural gas dehydration system. Once the dehydrated TEG 130 is cooled it is returned to the contactor 131 for reuse.

One of the waste products of processing water laden TEG 130 through a reboiler 132 as described in this background is paraffin 134. Paraffin 134 is a wax like substance that has no affinity for water, damages the equipment used in the natural gas dehydration system, and wastes TEG 130. Clearly, a method to remove paraffin 134 from the dehydrated TEG 130 would benefit the natural gas processor community.

SUMMARY OF INVENTION

This disclosure addresses the removal of paraffin from dehydrated TEG.

The add-on system for removing paraffin from a natural gas dehydration system is an apparatus for removing paraffin from dehydrated TEG. The add-on system for removing paraffin from a natural gas dehydration system processes the cooled and dehydrated TEG through a second heat exchanger which raises the temperature of the dehydrated TEG to a previously determined temperature. Once the dehydrated TEG is at temperature, the TEG is processed through one or more separators which separates the paraffin from the dehydrated TEG. The separated paraffin is collected in one or more collection apparatus for disposal while the processed TEG is released to further processing and delivery to the contactor for reuse.

These together with additional objects, features and advantages of the add-on system for removing paraffin from a natural gas dehydration system will be readily apparent to those of ordinary skill in the art upon reading the following detailed description of the presently preferred, but nonetheless illustrative, embodiments when taken in conjunction with the accompanying drawings.

In this respect, before explaining the current embodiments of the add-on system for removing paraffin from a natural gas dehydration system in detail, it is to be understood that the add-on system for removing paraffin from a natural gas dehydration system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the add-on system for removing paraffin from a natural gas dehydration system.

It is therefore important that the claims be regarded as including such equivalent construction insofar as they do not depart from the spirit and scope of the add-on system for removing paraffin from a natural gas dehydration system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE
EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
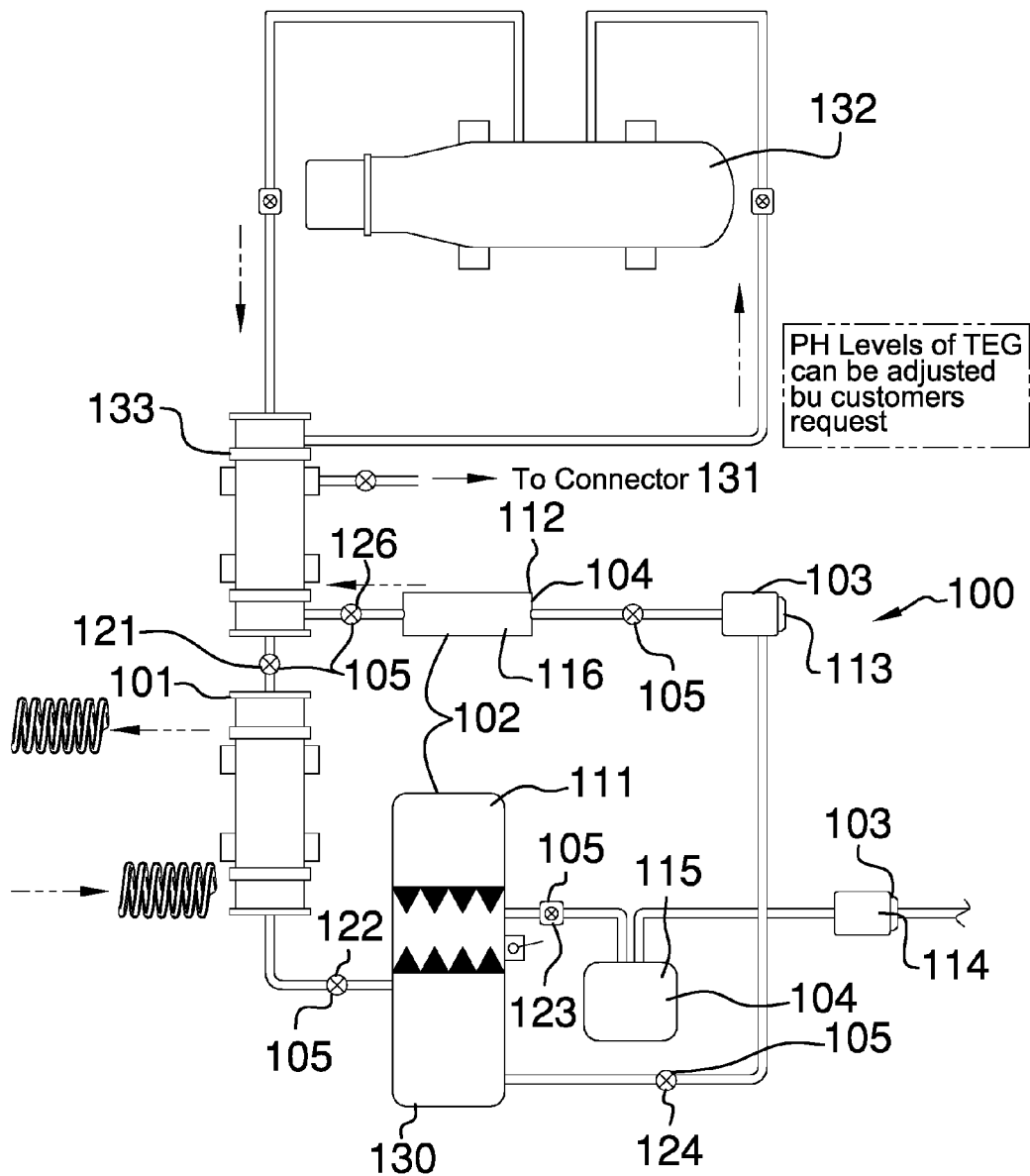
FIG. 1 is a block diagram of an embodiment of the disclosure.
Figure 2:
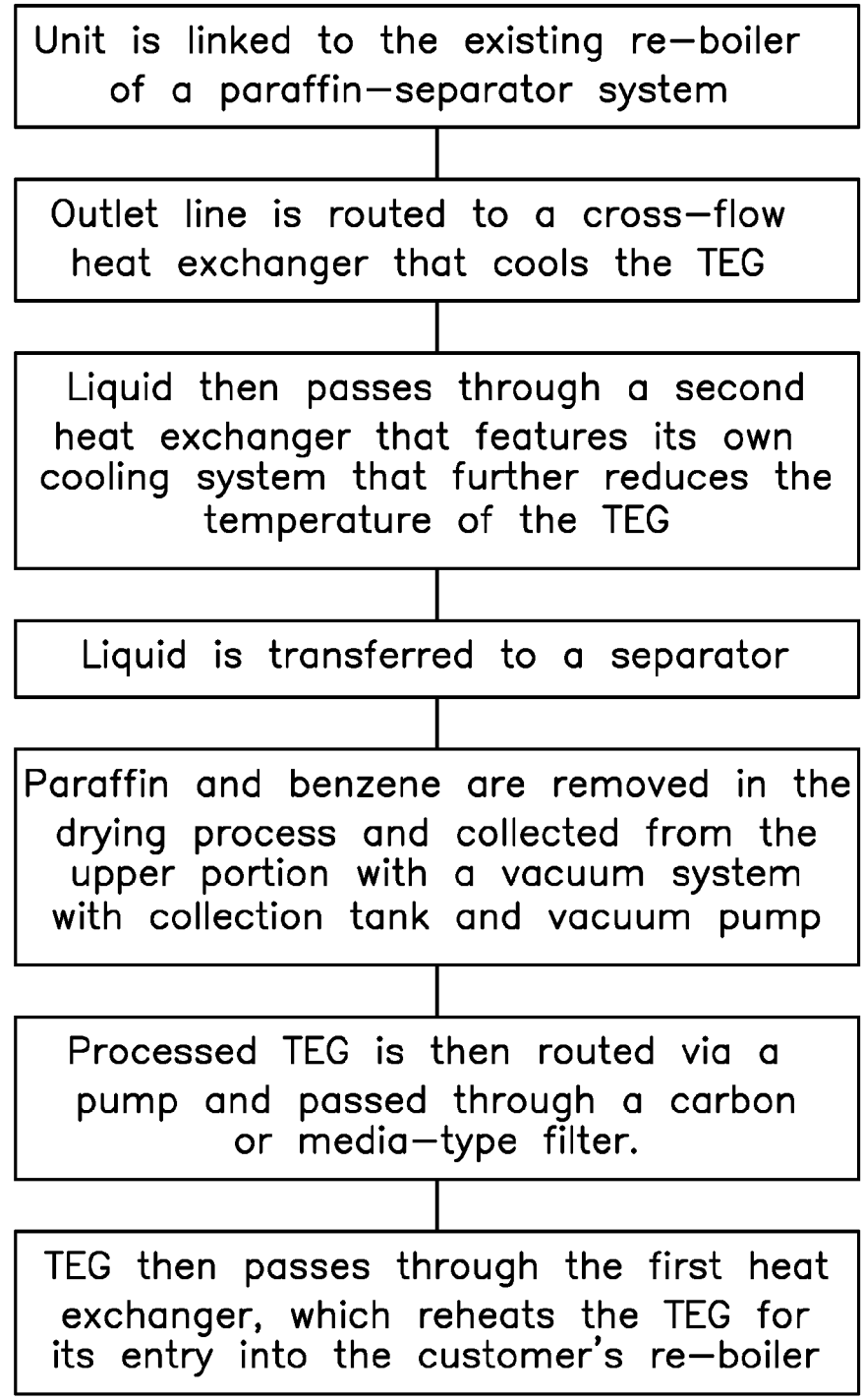
FIG. 2 is a detailed flowchart of an embodiment of the disclosure.
Figure 3:
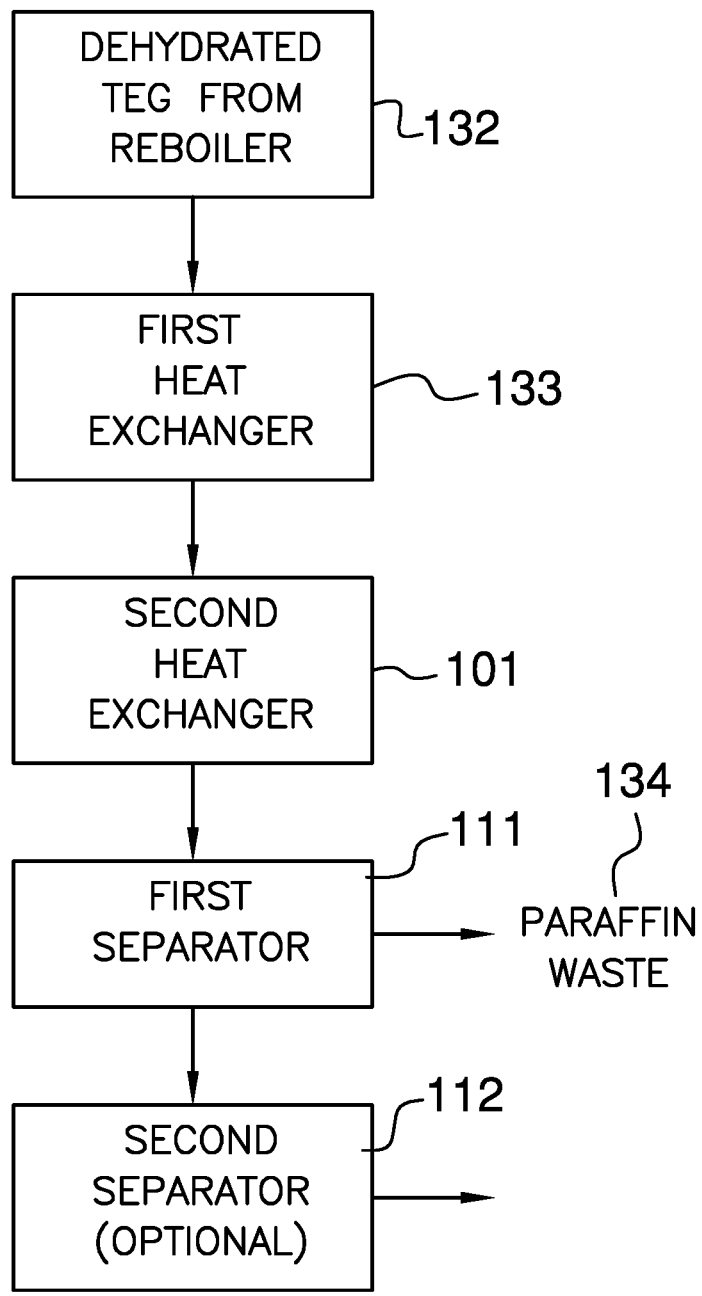
FIG. 3 is a summary flowchart of an embodiment of the disclosure.

Detailed reference will now be made to a plurality of potential embodiments of the disclosure, which are illustrated in FIGS. 1 through 3.

The add-on system for removing paraffin from a natural gas dehydration system 100 (hereinafter invention) comprises a second heat exchanger 101, one or more separators 102, one or more pumps 103, one or more collection apparatus 104, and a plurality of valves 105. The invention 100 is an apparatus for removing paraffin from dehydrated TEG 130. As shown most clearly in FIG. 3, the invention 100 processes the cooled and dehydrated TEG 130 through a second heat exchanger 101 which adjusts the temperature of the dehydrated TEG 130 to a previously determined temperature determined by the type of separation method. Once the dehydrated TEG 130 is at temperature, the TEG 130 is processed through one or more separators 102 which separates the paraffin from the dehydrated TEG 130. The specific method used by each of the one or more separators 102 is selected from a group consisting of a coagulation method, a filter method, and an evaporation method. The dehydrated TEG 130 is processed sequentially through each of the selected one or more separators 102. These methods are discussed in detail elsewhere in this disclosure. The separated paraffin is collected in one or more collection apparatus 104 for disposal while the processed TEG 130 is released to further processing and delivery to the contactor 131 for reuse. The one or more pumps 103 and the plurality of valves 105 are used to transport, route, and contain the dehydrated TEG 130 and the removed paraffin 134 through the invention 100.

Detailed reference is now made to the specific implementation of a first potential embodiment of the disclosure.

The second heat exchanger 101 is a commercially available and commonly used heat exchanger that is used to increase the temperature of the dehydrated TEG 130. The operating temperature of the second heat exchanger 101 is discussed elsewhere in this disclosure as part of the description of the operation of the one or more separators 102.

The one or more separators 102 further comprises a first separator 111 and a second separator 112. In the first potential embodiment of the disclosure, the first separator 111 performs the coagulation method of separation and is, in effect, a first storage tank. The second separator 112 performs the filter method of separation. The second separator 112 is a commercially available filter cartridge 116 that is installed in-line in the invention 100. The detailed operation of the one or more separators 102 are discussed elsewhere in this disclosure.

The one or more collection apparatus 104 further comprises a collection tank 115 and a filter cartridge 116. The collection tank 115 is a commercially available second storage tank that is intended to receive and store paraffin 134 from the first separator 111. The filter cartridge 116 is a commercially available filter cartridge that is suitable for in-line use.

The one or more pumps 103 further comprises a filter pump 113 and a vacuum pump 114. The filter pump 113 is a commercially available pump that is used to pump the dehydrated TEG 130 through a portion of the invention 100. The vacuum pump 114 is a commercially available vacuum device that is designed to draw solid paraffin from the first separator 111 into the collection tank 115. Methods to select pumps and incorporate pumps into systems are well known and documented in the mechanical and chemical arts.

The plurality of valves 105 further comprises a TEG inlet valve 121, a separator valve 122, a paraffin valve 123, a pump valve 124, a filter valve 125 and a TEG outlet valve 126. Each of the plurality of valves 105 is readily and commercially available valve. Methods to select valves and incorporate valves into systems are well known and documented in the mechanical and chemical arts.

The methods to select the pipes and to design the piping required to assemble the above described components are well known and documented in the mechanical, chemical, and plumbing arts.

The first potential embodiment of the disclosure, as shown most clearly in FIG. 1, is assembled and operated as described in this paragraph. The dehydrated TEG 130 is transported from the first heat exchanger 133 through the TEG inlet valve 121 into the second heat exchanger 101. The second heat exchanger 101 raises or lowers the temperature of the dehydrated TEG 130 to the previously determined temperature as required by the separation method used by the first separator 111. The flow of the dehydrated TEG 130 into the first separator 111 is controlled by the separator valve 122. The first separator 111 then separates the paraffin 134 from the dehydrated TEG 130 according to its designed method. The paraffin 134 is drawn out of the first separator 111 through the paraffin valve 123 into the collection tank 115. The paraffin 134 is drawn out of the first separator 111 using a vacuum generated by the vacuum pump 114. The initially processed dehydrated TEG 130 is drawn out of the first separator 111 through the pump valve 124 by the filter pump 113. The filter pump 113 pumps the initially processed dehydrated TEG 130 from the pump valve 124 through the filter valve 125 into the second separator 112. The second separator 112 processes the initially processed dehydrated TEG 130 to further remove paraffin from the initially processed dehydrated TEG 130 to create a completely processed TEG 130. In the first potential embodiment of the disclosure, the completely processed TEG 130 is released back into the natural gas dehydration system for reuse through the TEG outlet valve 126. As envisioned by the inventor, the completely processed TEG 130 would be reused as a medium in the first heat exchanger 133 before being returned to the contactor 131.

As discussed elsewhere in this disclosure, each of the one or more separators 102 implements a separation method selected from the group consisting of a coagulation method, a filter method, and an evaporation method.

The coagulation method is a settling method that takes advantage of the paraffin 134 being intermixed within the TEG in a colloidal manner. The relatively light density of the paraffin 134 (estimated density 0.79 gm per cubic cm) compared to the TEG 130 (estimated density 1.1 gm per cubic cm) will cause the paraffin to float to top of the colloid allowing it to be subsequently removed. The coagulation method requires a settling container. It is expected that the coagulation method will be most effective at temperatures between 20 C and 32 C. Methods to separate colloids in this manner are well known in the mechanical and chemical arts.

The filtering method is a mechanical filter that physically removes the paraffin 134 from the TEG 130. While the paraffin 134 molecule (estimated molecular weight>282 gm per mole) is larger than the TEG 130 molecule (molecular weight 150.2 gm per mole) the primary effectiveness of the filter is a result of the paraffin's 134 to tendency to coagulate within the paraffin 134 TEG 130 colloid creating particles large enough to be effectively filtered out as the paraffin 134 TEG 130 colloid is passed through the filter. The filter method requires a filter medium and a container to hold the filter medium. It is expected that the filtering method will not be effective at temperatures above 36 C which is the estimated melting point of the paraffin 134. Methods to filter solids from colloids in this manner are well known in the mechanical and chemical arts.

The evaporation method is a distillation method. In the evaporation method the temperature of the paraffin 134 (estimated boiling point 340 C) TEG 130 (boiling point 285 C) colloid is raised to a temperature above 285 C to boil off the TEG 130 leaving behind the paraffin 134. The evaporation method requires a container that can be heated and a heat source. Distillation methods to separate colloids and solutions in this manner are well known in the mechanical and chemical arts.

The components described in this disclosure are commercially available and their use is well known to those used in the mechanical, chemical and plumbing arts.

The following definitions were used in this disclosure:

Natural Gas: As used in this disclosure, the term natural gas refers to a gaseous fuel used to provide energy through combustion. The primary component of natural gas (typically >80%) is methane. Common secondary components include, but are not limited to, ethane, propane, butane, pentane, nitrogen, carbon dioxide and water vapor. Traces of alkenes, alkynes, cyclic carbon compounds and aromatic carbon compounds may also be found.

Paraffin: As used in this disclosure, paraffin is an organic molecule: 1) with a carbon base chain of greater than 20 atoms or carbon and oxygen base chain of greater than 20 carbon or oxygen atoms; and, 2) that is solid at room temperature. While it is explicitly recognized that technically a paraffin is an alkane, this disclosure purposely broadens the scope of the term to more closely match the use of the term paraffin as it is commonly used by those skilled in the operation of natural gas dehydration systems. For the purposes of this disclosure a paraffin can potentially further comprise carbon-carbon double bonds and functional groups including, but not limited to, aldehydes, esters, hydroxyls, and ketones.

TEG: As used in this disclosure, TEG is an abbreviation for triethylene glycol.

With respect to the above description, it is to be realized that the optimum dimensional relationship for the various components of the invention described above and in FIGS. 1 through 3, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A separating apparatus comprising:
   a first heat exchanger, one or more separators, one or more pumps, one or more collection apparatus, and a plurality of valves;
   wherein the separating apparatus is an apparatus for removing paraffin from triethylene glycol, hereinafter TEG;
   wherein the separating apparatus is adapted for use with a natural gas dehydrating system;
   wherein the first heat exchanger, the one or more separators, and the one or more collection apparatus are interconnected using the one or more pumps and the plurality of valves;
   wherein the separating apparatus processes the TEG through the first heat exchanger;
   wherein the separating apparatus processes the TEG through the one or more separators to separate the paraffin from the TEG;
   wherein the separating apparatus collects the separated paraffin in the one or more collection apparatus;
   wherein the specific method used by each of the one or more separators is selected from a group consisting of a coagulation method, a filter method, and an evaporation method;
   wherein the TEG is processed sequentially through each of the one or more separators;
   wherein the one or more separators further comprises a first separator and a second separator;
   wherein the TEG is processed sequentially through the first separator and the second separator;
   wherein the one or more pumps comprises a filter pump;
   wherein the filter pump transports TEG from the first separator to the second separator.

2. The separating apparatus according to claim 1
   wherein the one or more collection apparatus comprises a collection tank;
   wherein the one or more pumps further comprises a vacuum pump;
   wherein paraffin is transported from the first separator to the collection tank using the vacuum pump.

3. The separating apparatus according to claim 2
   wherein the plurality of valves further comprises a TEG inlet valve, a separator valve, a paraffin valve, a pump valve, a filter valve and a TEG outlet valve;
   wherein the TEG is transported from the natural gas dehydrating system through the TEG inlet valve into the first heat exchanger;
   wherein the first heat exchanger raises or lowers the temperature of the TEG to a previously determined temperature as required by the separation method used by the first separator;
   wherein the flow of the TEG into the first separator is controlled by the separator valve;
   wherein the first separator separates the paraffin from the TEG;
   wherein the paraffin is drawn out of the first separator through the paraffin valve into the collection tank;
   wherein the paraffin is drawn out of the first separator using a vacuum generated by the vacuum pump;
   wherein the TEG is drawn of the first separator through the pump valve by the filter pump;
   wherein the filter pump pumps the TEG from the pump valve through the filter valve into the second separator;
   wherein the second separator further separates paraffin from the TEG;
   wherein the TEG is returned to the natural gas dehydration system.

4. The separating apparatus according to claim 3 wherein the first separator is an evaporation method separator.

5. The separating apparatus according to claim 4 wherein the operating temperature of the first separator is between 285 C and 340 C.

6. The separating apparatus according to claim 4 wherein the second separator is a filter method separator.

7. The separating apparatus according to claim 6
wherein the operating temperature of the first separator is between 285 C and 340 C;
wherein the operating temperature of the second separator is less than 36 C.

8. The separating apparatus according to claim 4 wherein the second separator is a coagulation method separator.

9. The separating apparatus according to claim 8
wherein the operating temperature of the first separator is between 285 C and 340 C;
wherein the operating temperature of the second separator between 20 C and 32 C.

10. The separating apparatus according to claim 3 wherein the first separator is a coagulation method separator.

11. The separating apparatus according to claim 10 wherein the operating temperature of the first separator is between 20 C and 32 C.

12. The separating apparatus according to claim 10 wherein the second separator is a filter method separator.

13. The separating apparatus according to claim 12
wherein the operating temperature of the first separator is between 20 C and 32 C;
wherein the operating temperature of the second separator is less than 36 C.

14. The separating apparatus according to claim 3 wherein the first separator is a filter method separator.

15. The separating apparatus according to claim 14 wherein the operating temperature of the first separator is less than 36 C.

\* \* \* \* \*